(12) United States Patent
Iizuka et al.

(10) Patent No.: US 6,612,274 B2
(45) Date of Patent: Sep. 2, 2003

(54) VARIABLE VALVE CONTROL APPARATUS FOR INTERNAL COMBUSTION ENGINE AND METHOD THEREOF

(75) Inventors: Isamu Iizuka, Atsugi (JP); Satoru Watanabe, Atsugi (JP)

(73) Assignee: Hitachi Unisia Automotive, Ltd., Atsugi (JP)

( * ) Notice: Subject to any disclaimer, the term of this patent is extended or adjusted under 35 U.S.C. 154(b) by 0 days.

(21) Appl. No.: 10/279,912

(22) Filed: Oct. 25, 2002

(65) Prior Publication Data

US 2003/0079703 A1 May 1, 2003

(30) Foreign Application Priority Data

Oct. 29, 2001 (JP) ........................................ 2001-331353

(51) Int. Cl.[7] .................................................. F01L 1/34
(52) U.S. Cl. ................. 123/90.16; 123/90.15; 123/90.17; 123/90.31
(58) Field of Search ........................ 123/90.15–90.18, 123/90.31

(56) References Cited

U.S. PATENT DOCUMENTS

| | | | | |
|---|---|---|---|---|
| 5,529,031 A | * | 6/1996 | Yoshioka | 123/90.15 |
| 6,109,225 A | * | 8/2000 | Ogita et al. | 123/90.15 |
| 6,161,511 A | * | 12/2000 | Hashimoto | 123/90.15 |

FOREIGN PATENT DOCUMENTS

| | | |
|---|---|---|
| JP | 06-272580 | 9/1994 |
| JP | 2001-012262 | 1/2001 |

\* cited by examiner

*Primary Examiner*—Thomas Denion
*Assistant Examiner*—Kyle Riddle
(74) *Attorney, Agent, or Firm*—Foley & Lardner

(57) ABSTRACT

An open-close characteristic of an intake valve is controlled so that a target intake air amount for an engine can be obtained, and also a retarded angle limitation of closing timing of an exhaust valve is set based on opening timing of the intake valve, to control an open-close characteristic of the exhaust valve so that the closing timing of the exhaust valve becomes a more advance angle side than the retarded angle limitation.

19 Claims, 14 Drawing Sheets

VARIABLE VALVE CONTROL APPARATUS FOR INTERNAL COMBUSTION ENGINE AND METHOD THEREOF

FIELD OF THE INVENTION

The present invention relates to an apparatus and a method for controlling a variable valve mechanism, in an internal combustion engine provided with an intake side variable valve mechanism varying an open-close characteristic of an intake valve and an exhaust side variable valve mechanism varying an open-close characteristic of an exhaust valve.

RELATED ART OF THE INVENTION

Heretofore, there has been known an apparatus in which a target torque is calculated based on an accelerator opening and an engine rotation speed, and an open-close characteristic of an intake valve is varied so that a target intake air amount corresponding to the target torque can be obtained (refer to Japanese Unexamined Patent Publication No. 6-272580).

Further, there has also been known a variable valve event and lift mechanism varying continuously valve lift amounts and operating angles of engine valves (intake valve and exhaust valve) (refer to Japanese Unexamined Patent Publication No. 2001-012262)

In the case where an open-close characteristic of an intake valve (valve lift amount and/or valve timing) is variably controlled so as to obtain a target intake air amount, it becomes necessary to change the open-close characteristic of the intake valve over a wide range.

Consequently, there is a possibility that interference between the intake valve and exhaust valve occurs or the combustibility is degraded due to a change in valve overlap amount.

SUMMARY OF THE INVENTION

The present invention has been accomplished in view of the above problems and has an object to avoid interference between valves or combustibility degradation, while controlling an open-close characteristic of an intake valve to a requested characteristic according to operating conditions.

In order to achieve the above object, according to the present invention, the constitution is such that an open-close characteristic of an intake valve is determined based on operating conditions of an internal combustion engine to control an intake side variable valve mechanism, and also an open-close characteristic of an exhaust valve is determined according to the open-close characteristic of the intake valve to control an exhaust side variable valve mechanism.

The other objects and features of this invention will become understood from the following description with reference to the accompanying drawings.

PREFERRED EMBODIMENTS

Figure 1:
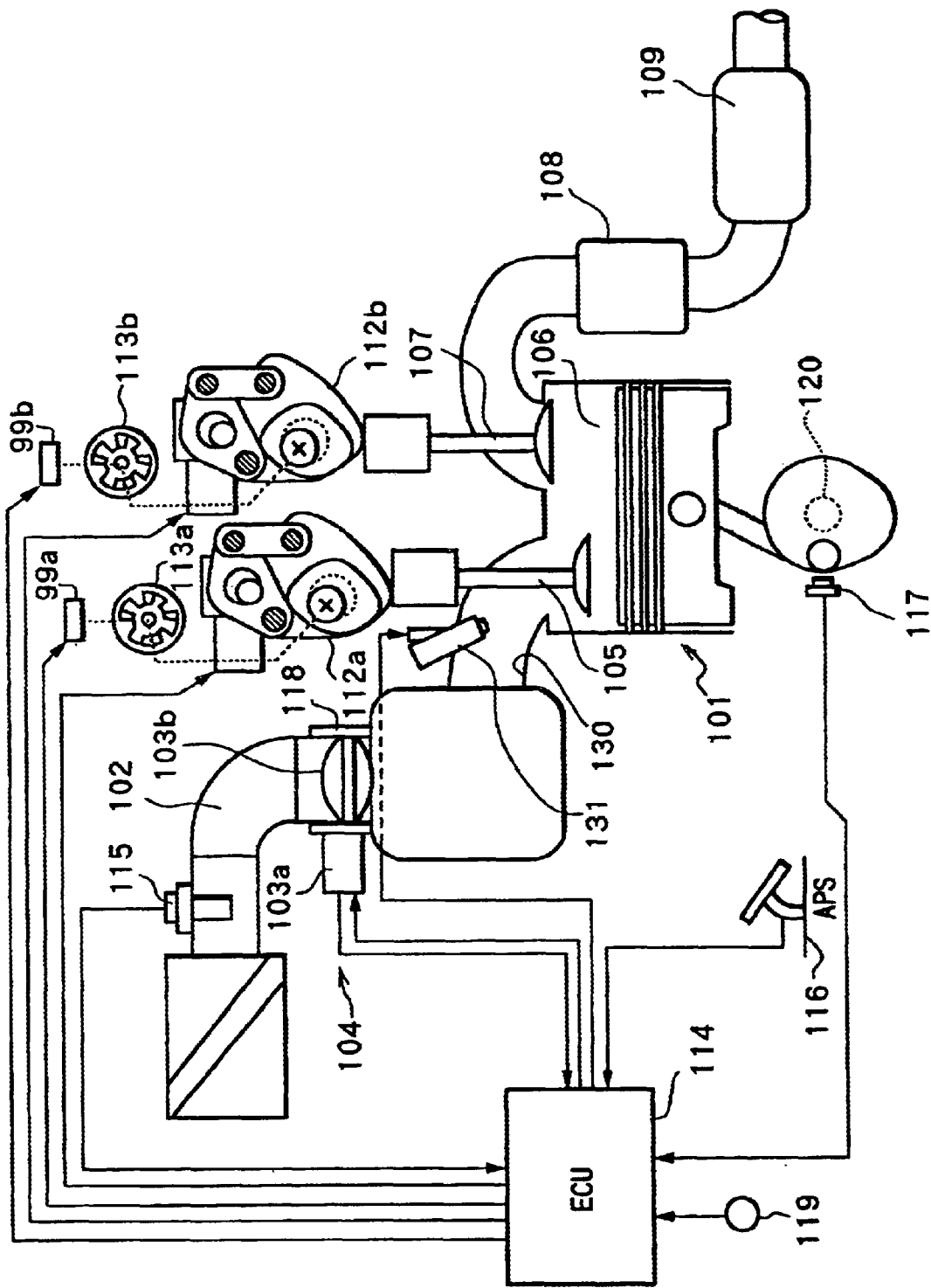
FIG. 1 is a diagram of a system structure of an internal combustion engine.

FIG. 1 is a structural diagram of an engine for vehicle in embodiments.

In an intake passage 102 of an engine 101, an electronically controlled throttle 104 is disposed for driving a throttle valve 103b to open and close by a throttle motor 103a.

Air is sucked into a combustion chamber 106 via electronically controlled throttle 104 and an intake valve 105.

A combusted exhaust gas of engine 101 is discharged from combustion chamber 106 via an exhaust valve 107, purified by a front catalyst 108 and a rear catalyst 109, and then emitted into the atmosphere.

A valve lift amount and a valve operating angle of intake valve 105 is varied continuously by a variable valve event and lift mechanism 112a, and a phase thereof during valve opening period is varied continuously by a variable valve timing mechanism 113a. A valve lift amount and a valve operating angle of exhaust valve 107 is varied continuously by a variable valve event and lift mechanism 112b, and a phase thereof during valve opening period is varied continuously by a variable valve timing mechanism 113b.

An engine control unit (ECU) 114 incorporating therein a microcomputer, controls electronically controlled throttle 104, variable valve event and lift mechanism 112a and variable valve timing mechanism 113a, so that an intake air amount corresponding to an accelerator opening can be obtained.

Further, engine control unit 114 controls variable valve event and lift mechanism 112b and variable valve timing mechanism 113b for exhaust valve 107 corresponding to an open-close characteristic of intake valve 105.

Engine control unit 114 receives various detection signals from an air flow meter 115 detecting an intake air amount 0 of engine 101, an accelerator pedal sensor APS 116 detecting an opening APO of an accelerator pedal, a crank angle sensor 117 taking out a rotation signal from a crankshaft 120, a throttle sensor 118 detecting an opening TVO of throttle valve 103b, a water temperature sensor 119 detecting a cooling water temperature Tw of engine 101, and the like.

In engine control unit 114, an engine rotation speed Ne is calculated based on the rotation signal output from crank angle sensor 117.

Further, an electromagnetic fuel injection valve 131 is disposed on an intake port 130 at the upstream side of intake valve 105 of each cylinder.

Fuel injection valve 131 injects fuel adjusted at a predetermined pressure toward intake valve 105 when driven to open by an injection pulse signal from engine control unit 114.

Figure 2:
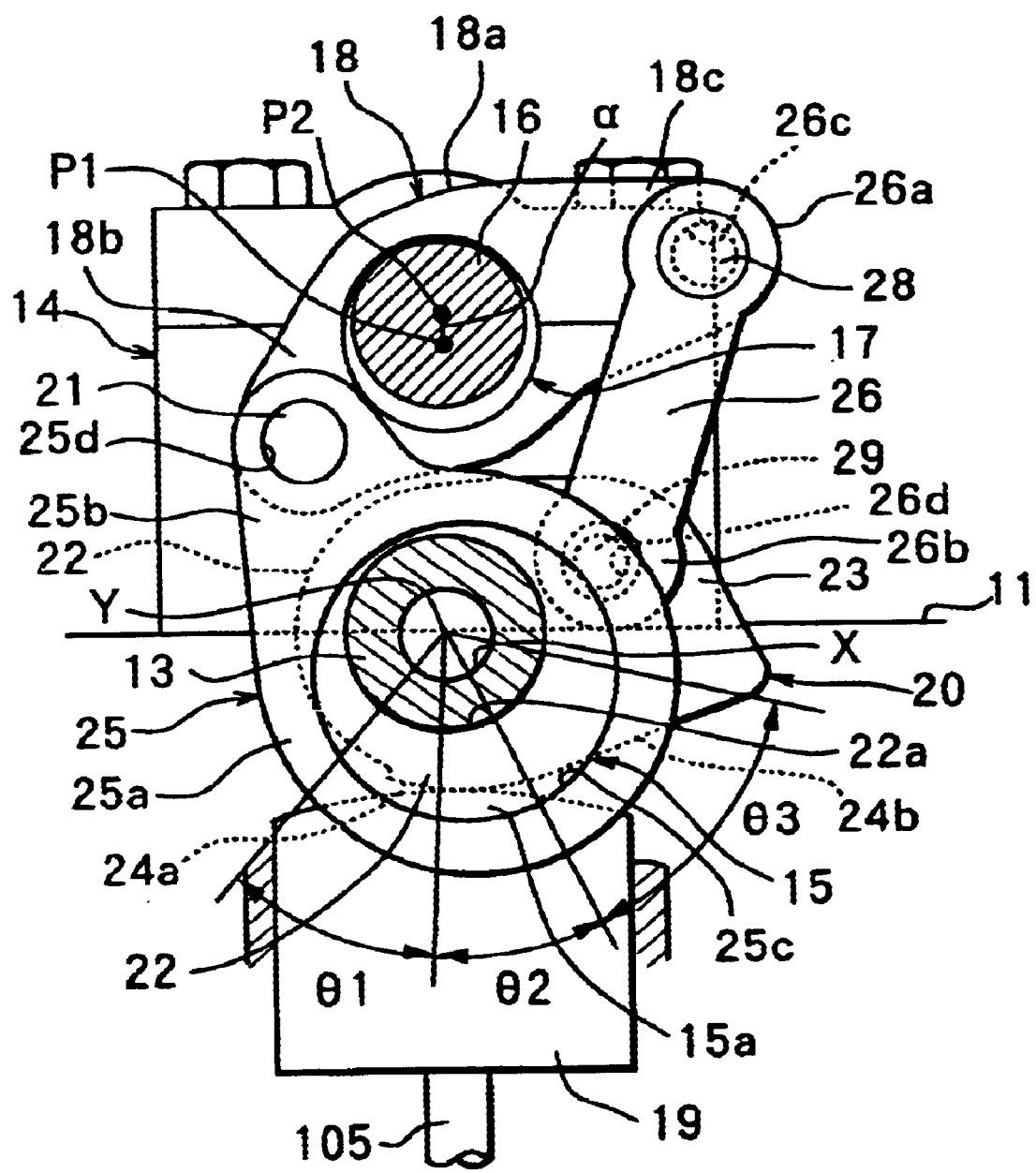
FIG. 2 is a cross section view showing a variable valve event and lift mechanism (A—A cross section of FIG. 3).
Figure 3:
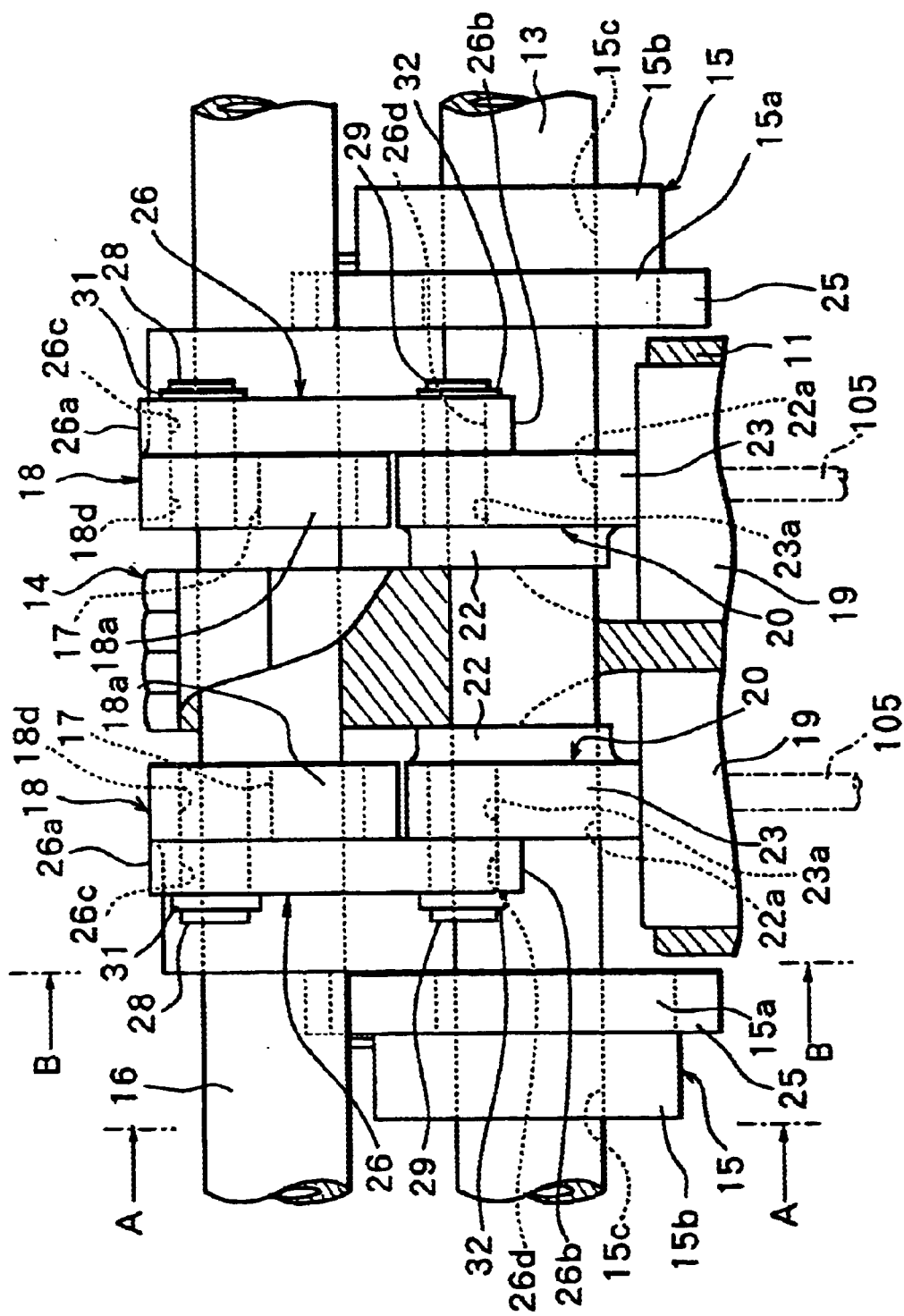
FIG. 3 is a side elevation view of the variable valve event and lift mechanism.
Figure 4:
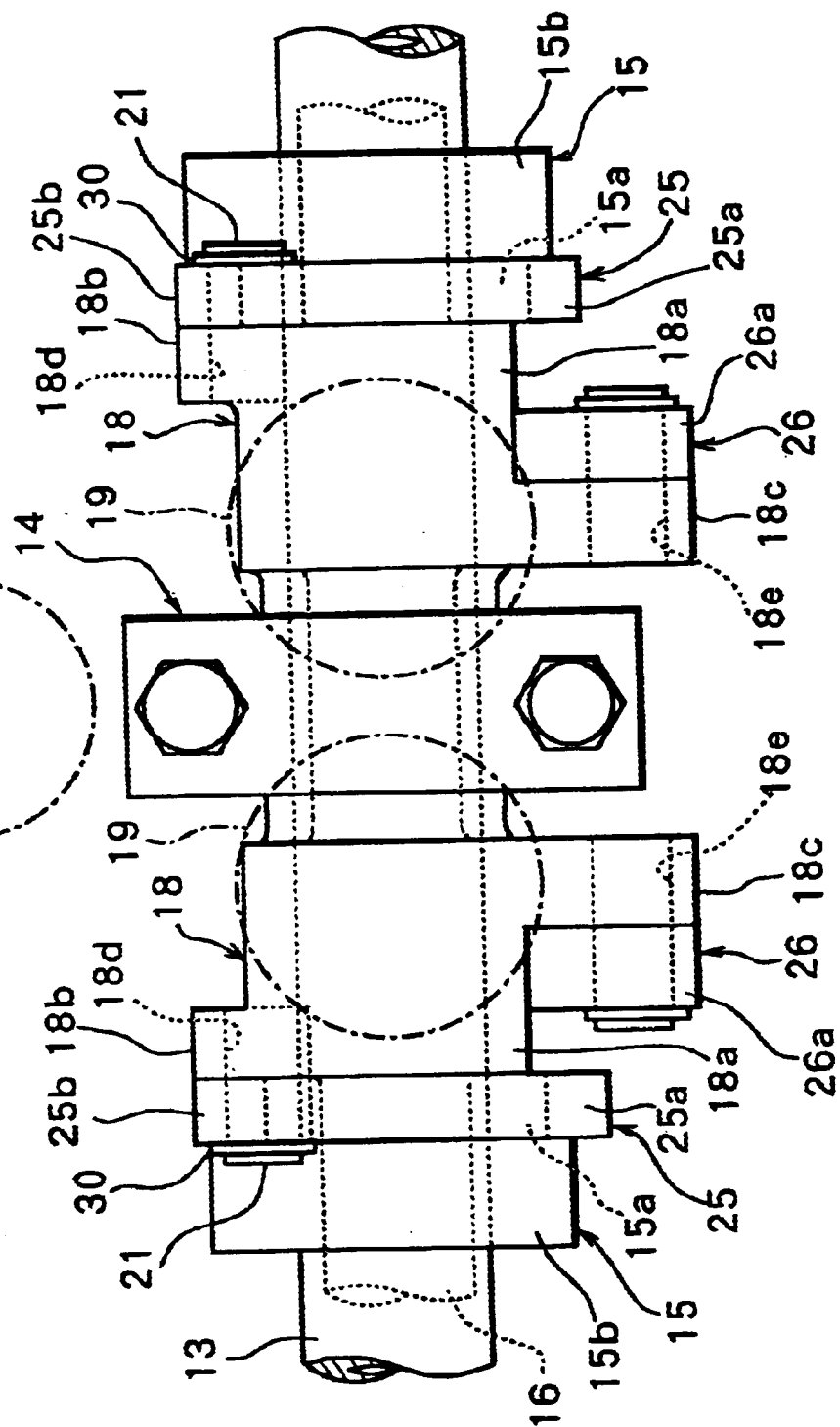
FIG. 4 is a top plan view of the variable valve event and lift mechanism.

FIG. 2 to FIG. 4 show in detail the structures of variable valve event and lift mechanisms 112a and 112b.

Variable valve event and lift mechanism 112a on the intake valve 105 side has the same structure as that of variable valve event and lift mechanism 112b on the exhaust valve 107 side.

Accordingly, in the following, variable valve event and lift mechanism 112a on the intake valve 105 side will be described, and the description of variable valve event and lift mechanism 112b on the exhaust valve 107 side will be omitted.

However, variable valve event and lift mechanisms 112a and 112b for varying valve lift amounts of intake valve 105 and exhaust valve 107, respectively, are not limited to the structure as shown in FIG. 2 to FIG. 4.

Variable valve event and lift mechanism 112 shown in FIG. 2 to FIG. 4 includes a pair of intake valves 105, 105, a camshaft (drive shaft) 13 rotatably supported by a cam bearing 14 of a cylinder head 11, two eccentric cams (drive cams) 15, 15 axially supported by camshaft 13, a control shaft 16 rotatably supported by cam bearing 14 and arranged in parallel at an upper position of camshaft 13, a pair of rocker arms 18, 18 swingingly supported by control shaft 16 through a control cam 17, and a pair of swing cams 20, 20 disposed to upper end portions of intake valves 105, 105 through valve lifters 19, 19, respectively.

Eccentric cams 15, 15 are connected with rocker arms 18, 18 by link arms 25, 25, respectively.

Rocker arms 18, 18 are connected with swing cams 20, 20 by link members 26, 26.

Rocker arms 18, 18, link arms 25, 25, and link members 26, 26 constitute a transmission mechanism.

Figure 5:
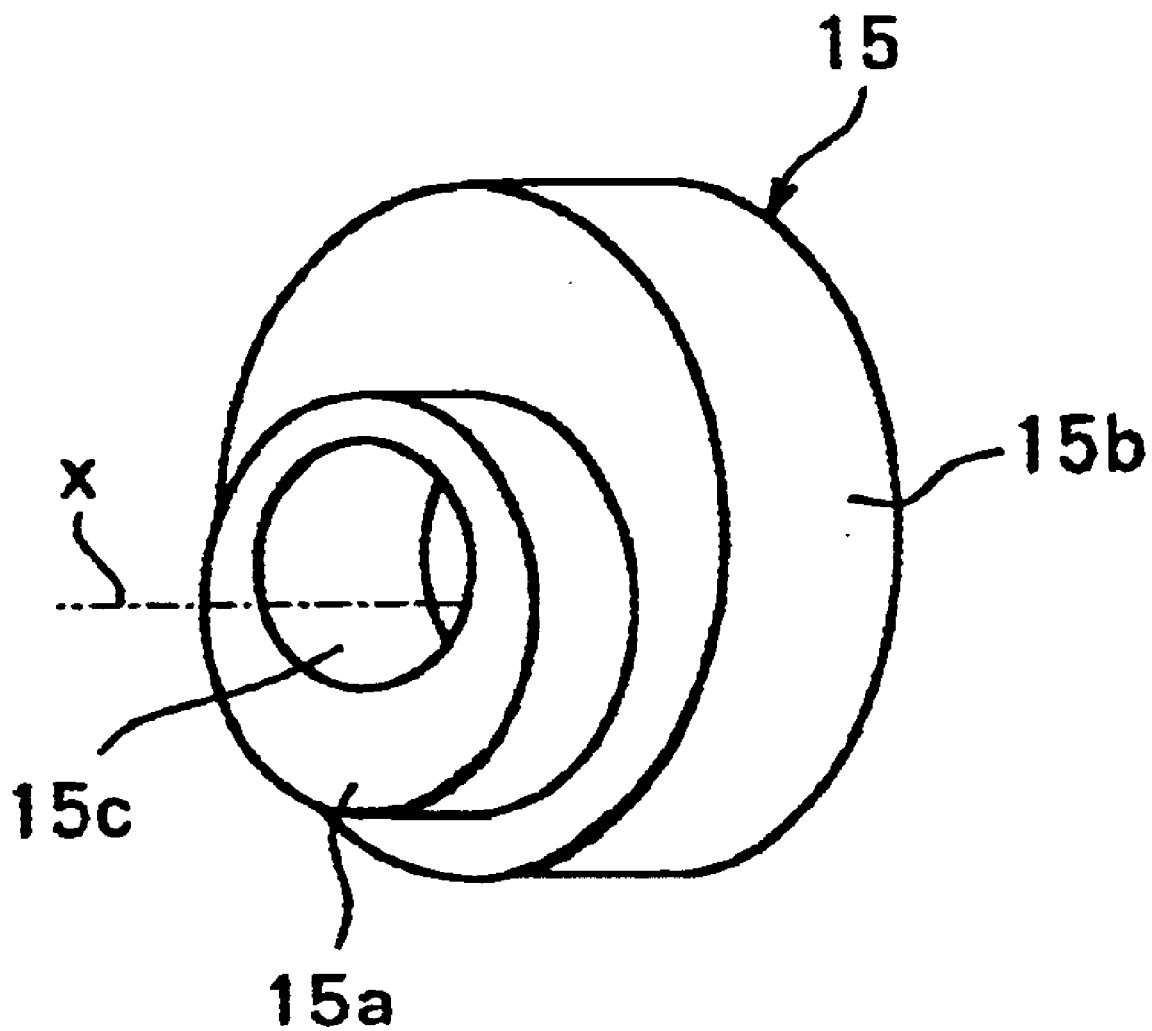
FIG. 5 is a perspective view showing an eccentric cam for use in the variable valve event and lift mechanism.

Each eccentric cam 15, as shown in FIG. 5, is formed in a substantially ring shape and includes a cam body 15a of small diameter, a flange portion 15b integrally formed on an outer surface of cam body 15a.

An insertion hole 15c is formed through the interior of eccentric cam 15 in an axial direction, and also a center axis X of cam body 15a is biased from a center axis Y of camshaft 13 by a predetermined amount.

Eccentric cams 15, 15 are pressed and fixed to camshaft 13 via camshaft insertion holes 15c so as to position at outsides of valve lifters 19, 19, respectively.

Each rocker arm 18, as shown in FIG. 4, is bent and formed in a substantially crank shape, and a central base portion 18a thereof is rotatably supported by control cam 17.

A pin hole 18d is formed through one end portion 18b which is formed to protrude from an outer end portion of base portion 18a. A pin 21 to be connected with a tip portion of link arm 25 is pressed into pin hole 18d.

A pin hole 18e is formed through the other end portion 18c which is formed to protrude from an inner end portion of base portion 18a. A pin 28 to be connected with one end portion 26a (to be described later) of each link member 26 is pressed into pin hole 18e.

Control cam 17 is formed in a cylindrical shape and fixed to a periphery of control shaft 16. As shown in FIG. 2, a center axis P1 position of control cam 17 is biased from a center axis P2 position of control shaft 16 by α.

Figure 6:
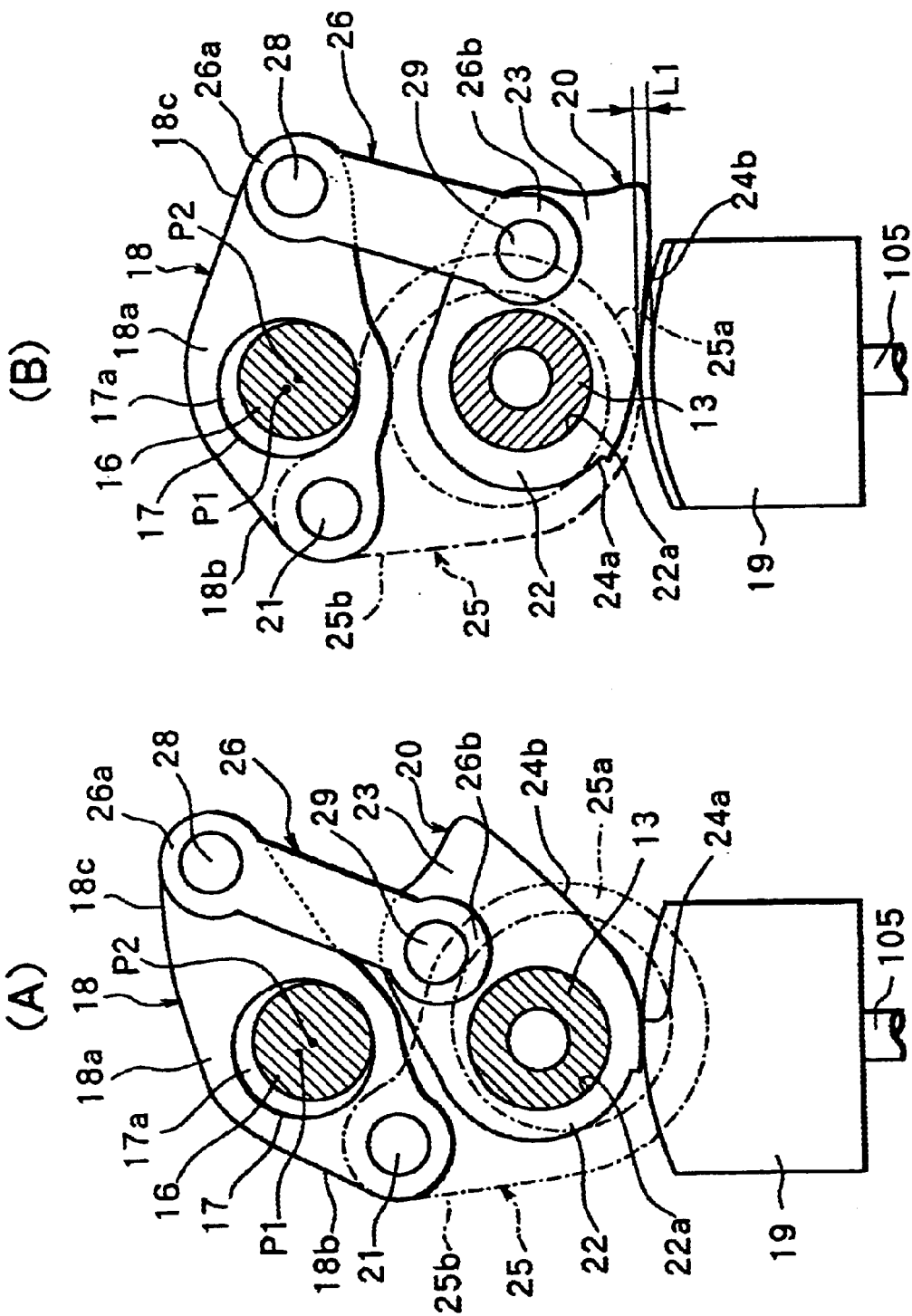
FIG. 6 is a cross section view showing an operation of the variable valve event and lift mechanism at a low lift condition (B—B cross section view of FIG. 3).
Figure 7:
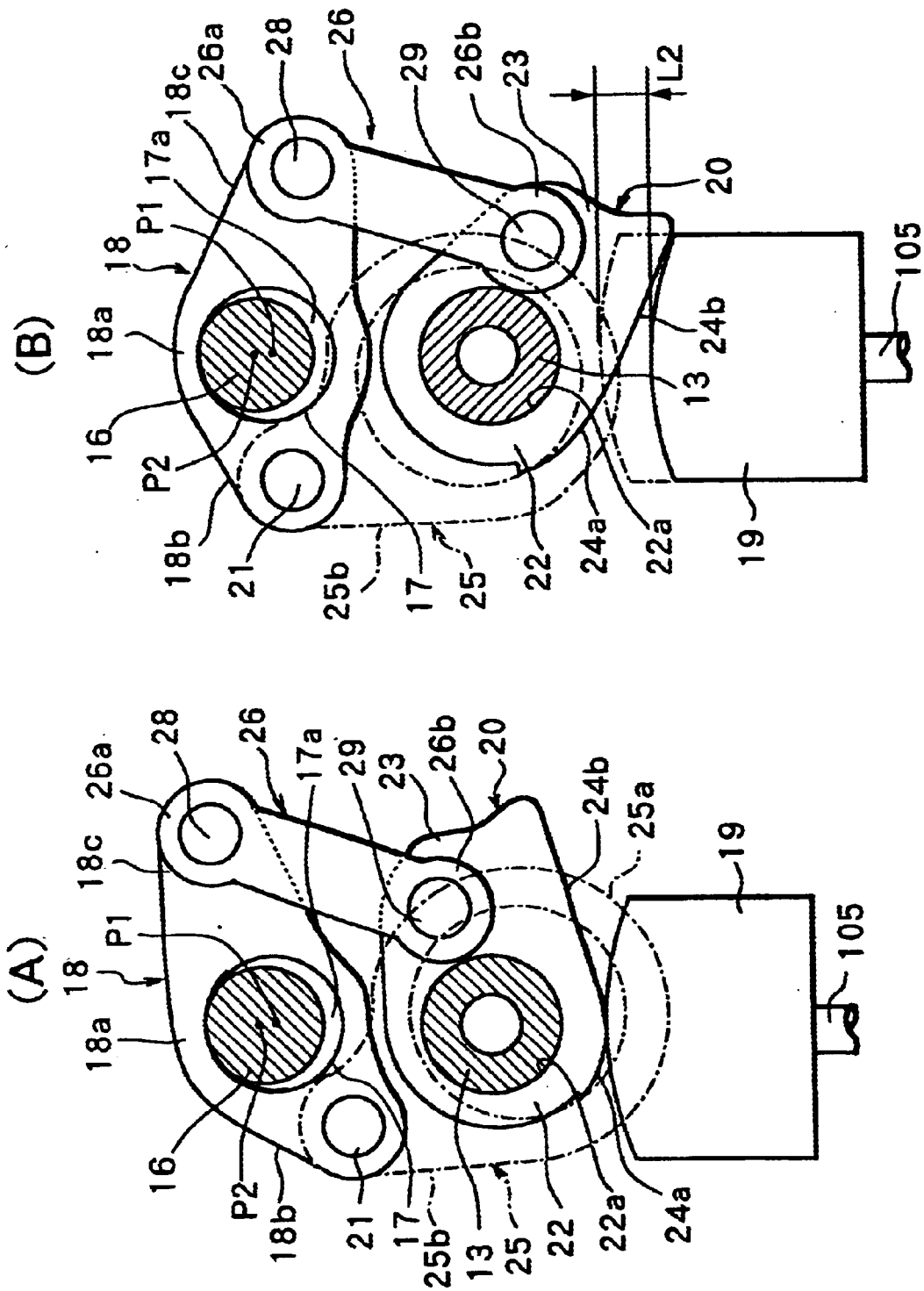
FIG. 7 is a cross section view showing an operation of the variable valve event and lift mechanism at a high lift condition (B—B cross section view of FIG. 3).

Swing cam 20 is formed in a substantially lateral U-shape as shown in FIG. 2, FIG. 6 and FIG. 7, and a supporting hole 22a is formed through a substantially ring-shaped base end portion 22. Camshaft 13 is inserted into supporting hole 22a to be rotatably supported. Also, a pin hole 23a is formed through an end portion 23 positioned at the other end portion 18c of rocker arm 18.

A base circular surface 24a of base end portion 22 side and a cam surface 24b extending in an arc shape from base circular surface 24a to an edge of end portion 23, are formed on a bottom surface of swing cam 20. Base circular surface 24a and cam surface 24b are in contact with a predetermined position of an upper surface of each valve lifter 19 corresponding to a swing position of swing cam 20.

Figure 8:
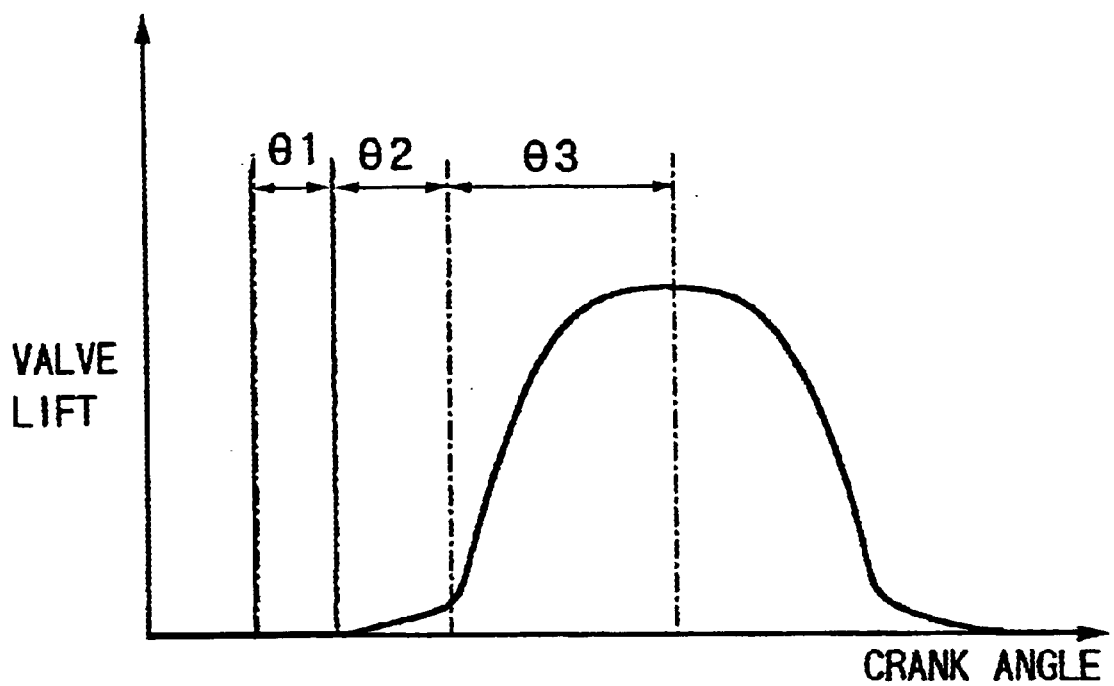
FIG. 8 is a valve lift characteristic diagram corresponding to a base end face and a cam surface of a swing cam in the variable valve event and lift mechanism.

Namely, according to a valve lift characteristic shown in FIG. 8, as shown in FIG. 2, a predetermined angle range θ1 of base circular surface 24a is a base circle interval and a range of from base circle interval θ1 of cam surface 24b to a predetermined angle range θ2 is a so-called ramp interval, and a range of from ramp interval θ2 of cam surface 24b to a predetermined angle range θ3 is a lift interval.

Link arm 25 includes a ring-shaped base portion 25a and a protrusion end 25b protrudingly formed on a predetermined position of an outer surface of base portion 25a. A fitting hole 25c to be rotatably fitted with the outer surface of cam body 15a of eccentric cam 15 is formed on a central position of base portion 25a. Also, a pin hole 25d into which pin 21 is rotatably inserted is formed through protrusion end 25b.

Link member 26 is formed in a linear shape of predetermined length and pin insertion holes 26c, 26d are formed through both circular end portions 26a, 26b. End portions of pins 28, 29 pressed into pin hole 18d of the other end portion 18c of rocker arm 18 and pin hole 23a of end portion 23 of swing cam 20, respectively, are rotatably inserted into pin insertion holes 26c, 26d.

Snap rings 30, 31, 32 restricting axial transfer of link arm 25 and link member 26 are disposed on respective end portions of pins 21, 28, 29.

In such a constitution, depending on a positional relation between the center axis P2 of control shaft 16 and the center axis P1 of control cam 17, as shown in FIG. 6 and FIG. 7, the valve lift amount is varied, and by driving control shaft 16 to rotate, the position of the center axis P2 of control shaft 16 relative to the center axis P1 of control cam 17 is changed.

Figure 10:
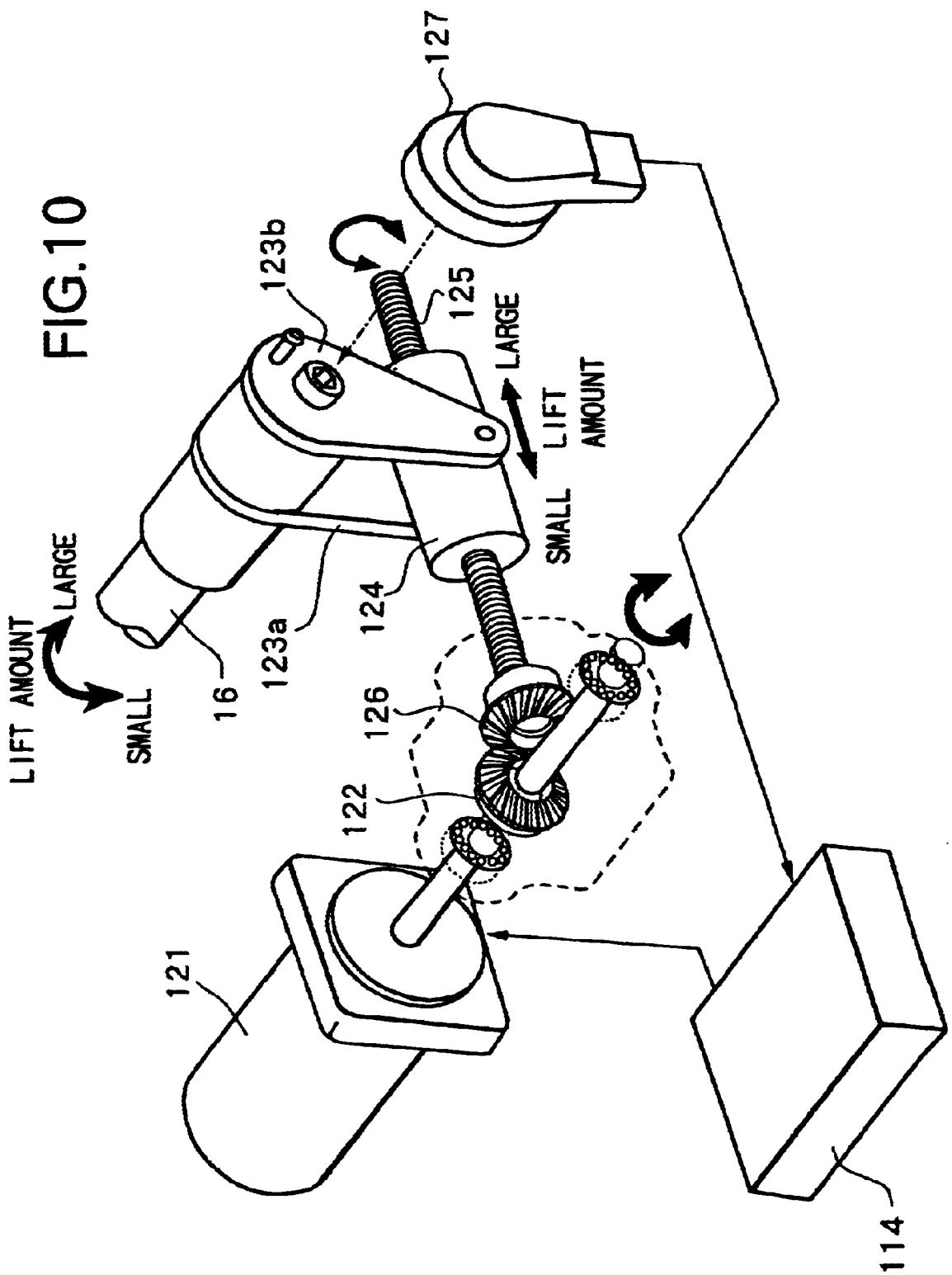
FIG. 10 is a perspective view showing a rotational driving mechanism of a control shaft in the variable valve event and lift mechanism.

Control shaft 16 is driven to rotate within a predetermined angle range by a DC servo motor (actuator) 121 as shown in FIG. 10.

Figure 9:
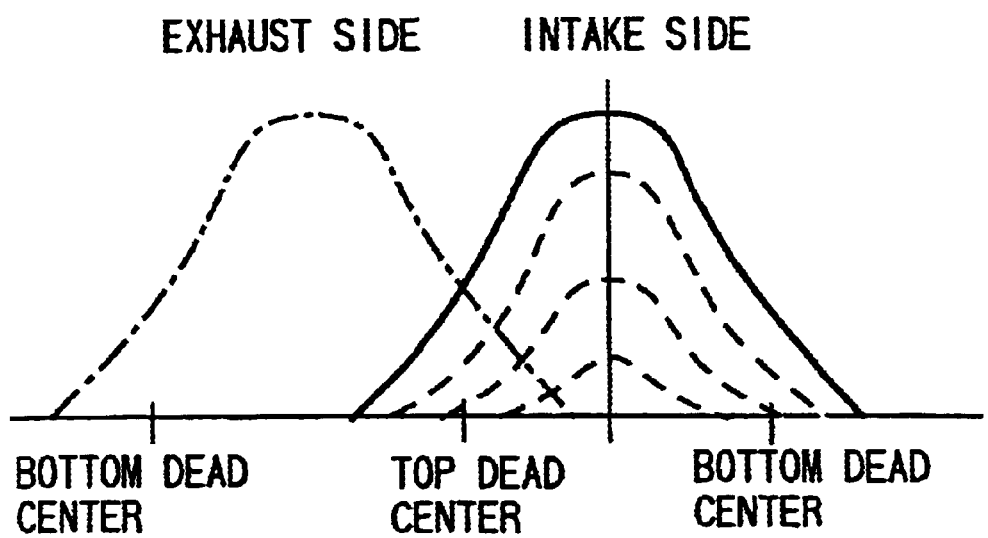
FIG. 9 is a characteristic diagram showing valve timing and a valve lift of the variable valve event and lift mechanism.

By varying an operating angle of control shaft 16 by DC servo motor 121, the valve lift amount and valve operating angle of each of intake valves 105, 105 are continuously varied (refer to FIG. 9).

In this embodiment, the larger the operating angle of control shaft 16 becomes, the larger the lift amount of intake valve 105 becomes.

In FIG. 10, DC servo motor 121 is arranged so that the rotation shaft thereof is parallel to control shaft 16, and a bevel gear 122 is axially supported by the tip portion of the rotation shaft.

On the other hand, a pair of stays 123a, 123b are fixed to the tip end of control shaft 16. A nut 124 is swingingly supported around an axis parallel to control shaft 16 connecting the tip portions of the pair of stays 123a, 123b.

A bevel gear 126 meshed with bevel gear 122 is axially supported at the tip end of a threaded rod 125 engaged with nut 124. Threaded rod 126 is rotated by the rotation of DC servo motor 121, and the position of nut 124 engaged with threaded rod 125 is displaced in an axial direction of threaded rod 125, so that control shaft 16 is rotated.

Here, the valve lift amount is decreased as the position of nut 124 approaches bevel gear 126, while the valve lift amount is increased as the position of nut 124 gets away from bevel gear 126.

Further, a potentiometer type operating angle sensor 127 detecting the operating angle of control shaft 16 is disposed on the tip end of control shaft 16, as shown in FIG. 10.

Control unit 114 feedback controls DC servo motor (actuator) 121 so that an actual operating angle detected by operating angle sensor 127 coincides with a target operating angle.

Figure 11:
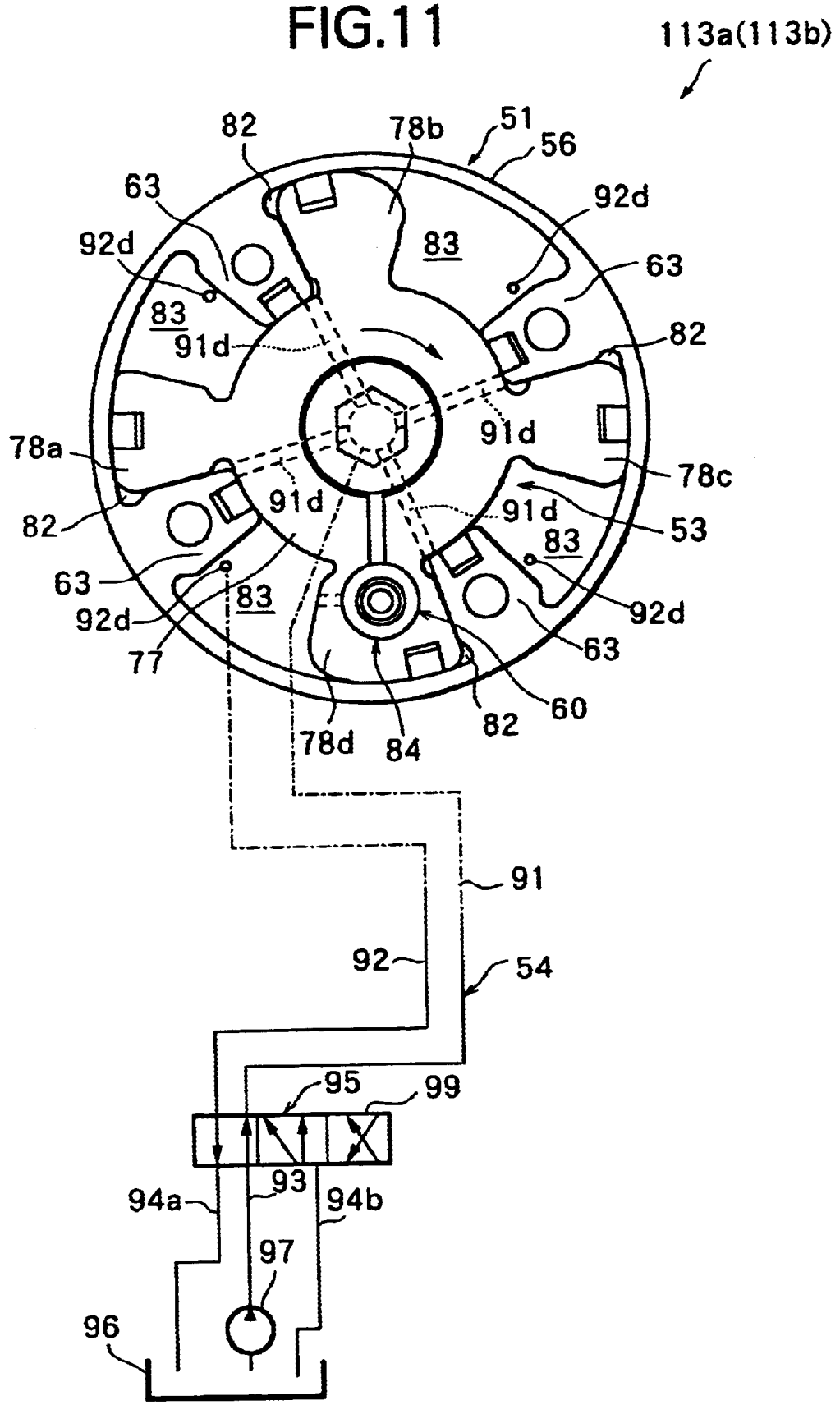
FIG. 11 is a longitudinal cross section view of a variable valve timing mechanism.

Next, the structures of variable valve timing mechanism 113a on intake valve 105 side and variable valve timing mechanism 113b on exhaust valve 107 side will be described based on FIG. 11.

Variable valve timing mechanism 113a on the intake valve 105 side has the same structure as that of variable valve timing mechanism 113b on the exhaust valve 107 side.

However, variable valve timing mechanisms 113a and 113b are not limited to the structure as shown in FIG. 10, and may be of a structure that varies continuously a rotation phase of camshaft relative to crankshaft.

Each of variable valve timing mechanisms 113a and 113b in this embodiment is a so-called vane type variable valve timing mechanism, and comprises: a cam sprocket 51 (timing sprocket) which is rotatably driven by a crankshaft 120 via a timing chain; a rotation member 53 secured to an end portion of a camshaft and rotatably housed inside cam sprocket 51; a hydraulic circuit 54 that relatively rotates rotation member 53 with respect to cam sprocket 51; and a lock mechanism 60 that selectively locks a relative rotation position between cam sprocket 51 and rotation member 53 at predetermined positions.

Cam sprocket 51 comprises: a rotation portion (not shown in the figure) having on an outer periphery thereof, teeth for engaging with timing chain (or timing belt); a housing 56 located forward of the rotation portion, for rotatably housing rotation member 53; and a front cover and a rear cover (not shown in the figure) for closing the front and rear openings of housing 56.

Housing 56 presents a cylindrical shape formed with both front and rear ends open and with four partition portions 63 protrudingly provided at positions on the inner peripheral face at 90° in the circumferential direction, four partition portions 63 presenting a trapezoidal shape in transverse section and being respectively provided along the axial direction of housing 56.

Rotation member 53 is secured to the front end portion of camshaft and comprises an annular base portion 77 having four vanes 78a, 78b, 78c, and 78d provided on an outer peripheral face of base portion 77 at 90° in the circumferential direction.

First through fourth vanes 78a to 78d present respective cross-sections of approximate trapezoidal shapes. The vanes are disposed in recess portions between each partition portion 63 so as to form spaces in the recess portions to the front and rear in the rotation direction. An advance angle side hydraulic chambers 82 and a retarded angle side hydraulic chambers 83 are thus formed.

Lock mechanism 60 has a construction such that a lock pin 84 is inserted into an engagement hole (not shown in the figure) at a rotation position (in the reference operating condition) on the maximum retarded angle side of rotation member 53.

Hydraulic circuit 54 has a dual system oil pressure passage, namely a first oil pressure passage 91 for supplying and discharging oil pressure with respect to advance angle side hydraulic chambers 82, and a second oil pressure passage 92 for supplying and discharging oil pressure with respect to retarded angle side hydraulic chambers 83.

To these two oil pressure passages 91 and 92 are connected a supply passage 93 and drain passages 94a and 94b, respectively, via an electromagnetic switching valve 95 for switching the passages.

An engine driven oil pump 97 for pumping oil in an oil pan 96 is provided in supply passage 93, and the downstream ends of drain passages 94a and 94b are communicated with oil pan 96.

First oil pressure passage 91 is formed substantially radially in a base 77 of rotation member 53, and connected to four branching paths 91d communicating with each advance angle side hydraulic chamber 82. Second oil pressure passage 92 is connected to four oil galleries 92d opening to each retarded angle side hydraulic chamber 83.

With electromagnetic switching valve 95, an internal spool valve is arranged so as to control the switching between respective oil pressure passages 91 and 92, and supply passage 93 and drain passages 94a and 94b.

Engine control unit 114 controls the power supply quantity for an electromagnetic actuator 99 that drives electromagnetic switching valve 95, based on a duty control signal superimposed with a dither signal.

For example, when a control signal of duty ratio 0% (OFF signal) is output to electromagnetic actuator 99, the hydraulic fluid pumped from oil pump 47 is supplied to retarded angle side hydraulic chambers 83 via second oil pressure passage 92, and the hydraulic fluid in advance angle side hydraulic chambers 82 is discharged into oil pan 96 from first drain passage 94a via first oil pressure passage 91.

Consequently, an inner pressure of retarded angle side hydraulic chambers 83 becomes a high pressure while an inner pressure of advance angle side hydraulic chambers 82 becomes a low pressure, and rotation member 53 is rotated to the most retarded angle side by means of vanes 78a to 78d. The result of this is that a valve opening period is delayed relative to a rotation phase angle of crankshaft.

On the other hand, when a control signal of duty ratio 100% (ON signal) is output to electromagnetic actuator 99, the hydraulic fluid is supplied to inside of advance angle side hydraulic chambers 82 via first oil pressure passage 91, and the hydraulic fluid in retarded angle side hydraulic chambers 83 is discharged to oil pan 96 via second oil pressure passage 92, and second drain passage 94b, so that retarded angle side hydraulic chambers 83 become a low pressure.

Therefore, rotation member 53 is rotated to the full to the advance angle side by means of vanes 78a to 78d. Due to this, the valve opening period is advanced relative to the rotation phase angle of crankshaft.

Next, there will be described controls of each of variable valve event and lift mechanisms 112a and 112b, and of each of variable valve timing mechanisms 113a and 113b referring to block diagrams of FIG. 12 to FIG. 14.

Figure 12:
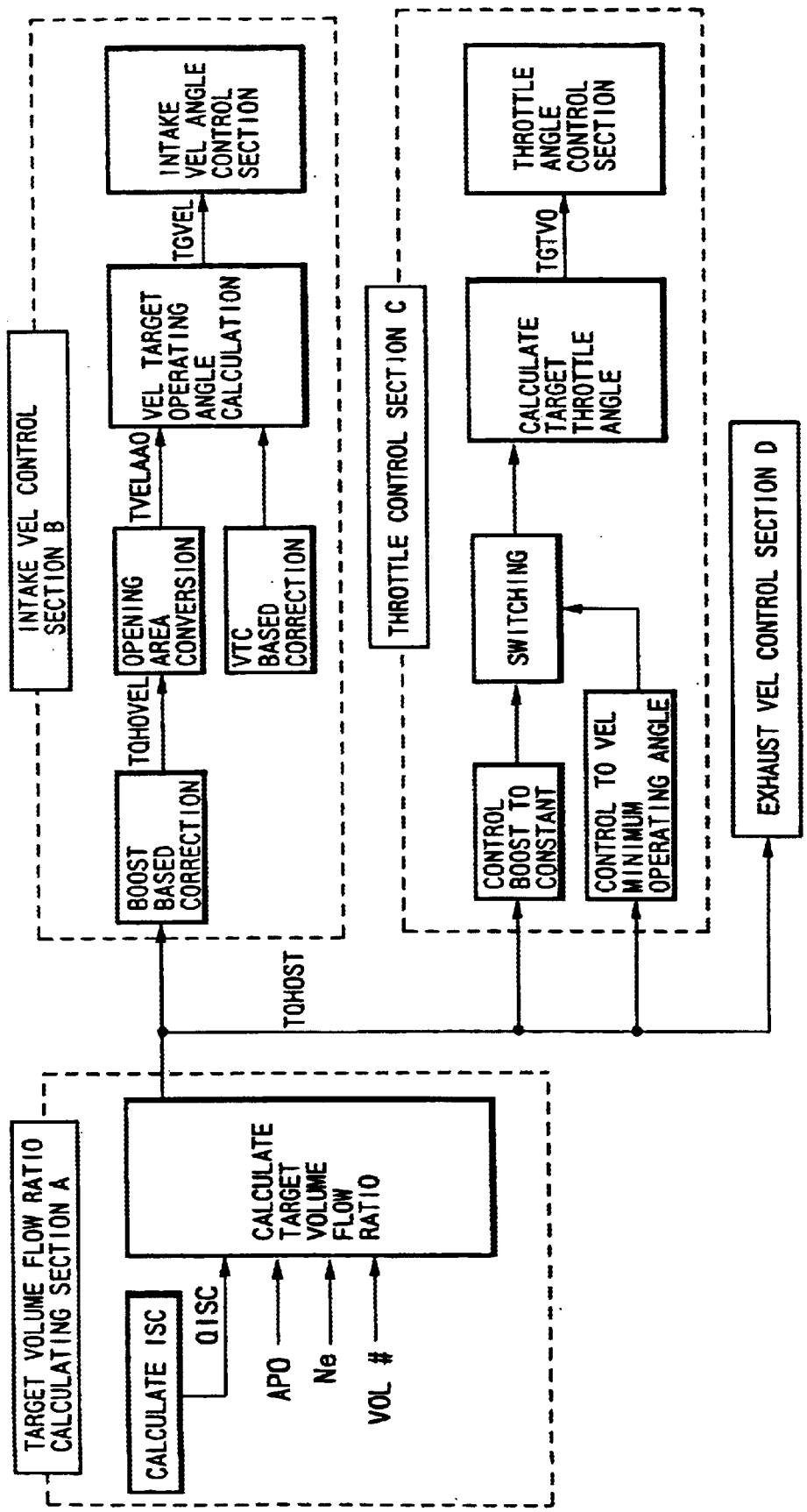
FIG. 12 is a control block diagram showing an intake air amount control.

As shown in FIG. 12, engine control unit 114 comprises a target volume flow ratio calculating section A, an intake side VEL control section B, a throttle control section C and an exhaust side VEL control section D.

In target volume flow ratio calculating section A, a target volume flow ratio TQH0ST (target intake air amount) of engine 101 is calculated in the following manner.

Firstly, a requested air amount Q0 corresponding to accelerator opening APO and engine rotation speed Ne is calculated, and also a requested ISC air amount QISC requested in an idle rotation speed control (ISC) is calculated.

Then, a sum of requested air amount Q0 and requested ISC air amount QISC is obtained as a total requested air amount Q.

$$Q\ (=Q0+QISC)$$

The resultant total requested air amount Q is divided by engine rotation speed Ne and an effective discharge amount (entire cylinder volume) VOL# to calculate target volume flow ratio TQH0ST.

$$TQH0ST=Q/(Ne \cdot VOL\#)$$

In intake side VEL control section B, target volume flow ratio TQH0ST is corrected according to an intake negative pressure.

Further, a target operating angle TGVEL (intake side target valve lift amount) of control shaft 16 in intake side variable valve event and lift mechanism 112a is calculated, based on a post-corrected target volume flow ratio TQH0VEL and a correction value based on valve timing controlled by variable valve timing mechanism 113a.

Then, DC servo motor 121 in variable valve event and lift mechanism 112a is feedback controlled, so that an actual operating angle coincides with intake side target operating angle TGVEL (intake side target valve lift amount).

In throttle control section C, a volume flow ratio requested for throttle valve 103b is calculated to control the intake negative pressure to be constant.

Further, intake side target operating angle TGVEL is controlled to be equal to or above a minimum lift amount (minimum operating angle) in variable valve event and lift mechanism 112a.

Therefore, when intake side target operating angle TGVEL (intake side target valve lift amount) larger than a value equivalent to target volume flow ratio TQH0ST is set, a volume flow ratio for compensating for an excess portion of volume flow ratio is calculated in throttle control section C.

Here, a smaller one is selected from the volume flow ratio for controlling the intake negative pressure to be constant and the volume flow ratio for compensating for an excess portion of volume flow ratio controlled by intake valve 105, and the selected volume flow ratio is converted into a target angle TGTVO of throttle valve 103b.

Then, throttle motor 103a is feedback controlled so that an angle (opening) of throttle valve 103b coincides with target angle TGTVO.

Figure 13:
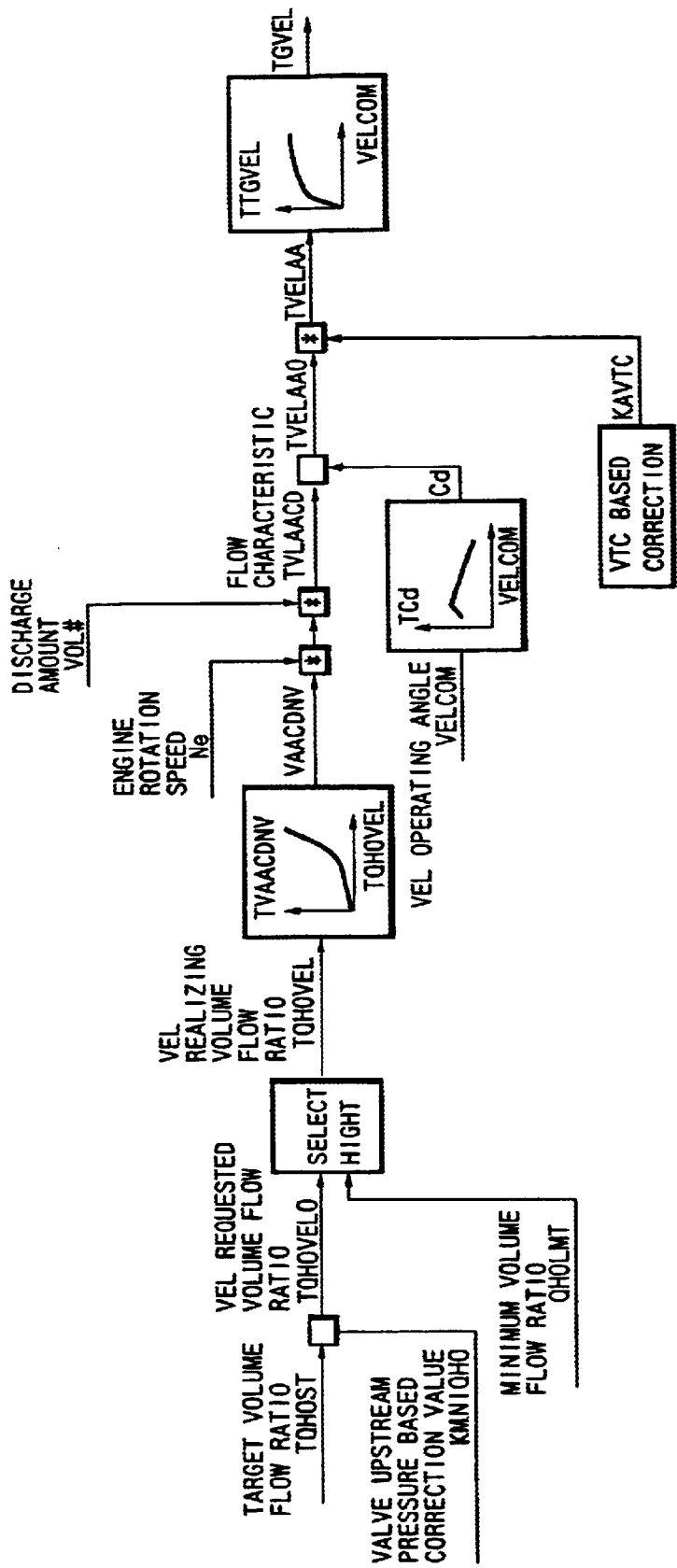
FIG. 13 is a control block diagram showing a control section of the variable valve event and lift mechanism on an intake side.

A block diagram in FIG. 13 shows the detail of intake side VEL control section B.

Target volume flow ratio TQH0ST is corrected by a correction value KMNIQH0 according to the intake negative pressure (valve upstream pressure).

Then, a larger one is selected from a post-corrected target volume flow ratio TQH0VEL0 and a minimum volume flow ratio QH0LMT controllable by means of a valve lift amount control by variable valve event and lift mechanism 112a, to be output as target volume flow ratio TQH0VEL.

Here, when minimum volume flow ratio QH0LMT is selected, a throttle amount of throttle valve 103b is set for obtaining target volume flow ratio TQH0VEL in throttle control section B.

Consequently, by performing cooperatively the valve lift amount control of intake valve 105 and the throttle amount control of throttle valve 103b, the volume flow ratio is controlled to target volume flow ratio TQH0VEL.

Target volume flow ratio TQH0VEL is converted into a state amount VMCDNV, and further multiplied by engine rotation speed Ne and discharge amount (entire cylinder volume) VOL#, to be converted into an entire opening area TVLAACD requested for intake valve 105.

Entire opening area TVLAACD is corrected based on a valve lift amount VELCOM, and flow loss coefficients Cd and KAVTC according to valve timing, to be output as a requested opening area TVELAA, and further converted into target operating angle TGVEL.

Figure 14:
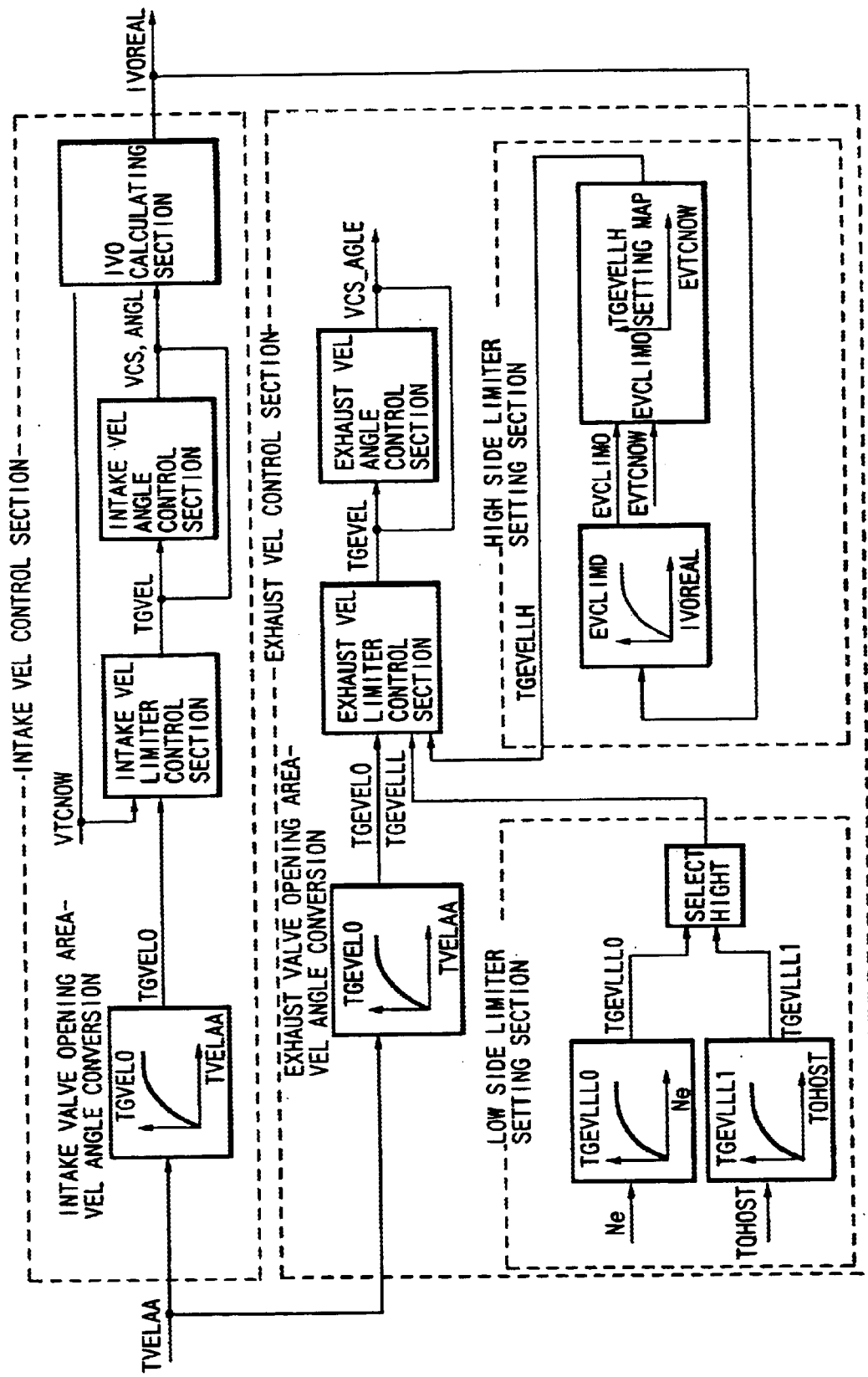
FIG. 14 is a control block diagram showing a control section of the variable valve event and lift mechanism on an exhaust side.

Further, target operating angle TGVEL, as shown in FIG. 14, is subjected to a limitation according to valve timing VTCNOW by variable valve timing mechanism 113a.

Then, based on the thus limited final target operating angle TGVEL, DC servo motor 121 in variable valve event and lift mechanism 112a is feedback controlled.

Further, opening timing IVOREAL of intake valve 105 is calculated based on an actual operating angle VCS-ANGL as a control result and valve timing VTCNOW, to be output to exhaust side VEL control section D.

Note, variable valve timing mechanisms 113a and 113b are controlled according to an engine load (target volume flow ratio TQH0ST) and engine rotation speed.

A block diagram in FIG. 14 shows the detail of exhaust side VEL control section D, that controls variable valve event lift mechanism 112b and variable valve timing mechanism 113b on the exhaust side.

Referring to the block diagram in FIG. 14, in a LOW side limiter setting section, a first minimum valve lift amount TGEVLLL0 is set according to engine rotation speed Ne, and also a second minimum valve lift amount TGEVLLL1 is set based on target volume flow ratio TQH0ST.

A larger one in first minimum valve lift amount TGEVLLL0 and second minimum valve lift amount TGEVLLL1 is output as a minimum valve lift amount (minimum operating angle) TGEVLLL of exhaust valve 107.

First minimum valve lift amount TGEVLLL0 is set to be a larger value as engine rotation speed Ne is higher.

In variable valve event and lift mechanisms 112a and 112b in this embodiment, since an allowable rotation speed is lower as the valve lift amount is smaller, if a high rotation operation is performed under a state of low valve lift amount, there may occur a failure of mechanism.

Therefore, the valve lift amount is limited to be equal to or above an amount having durability to engine rotation speed Ne, by first minimum valve lift amount TGEVLLL0.

Further, second minimum valve lift amount TGEVLLL1 is a minimum valve lift amount required for gas exchange at target volume flow ratio TQH0ST.

On the other hand, in a HIGH side limiter setting section, a maximum valve lift amount (maximum operating angle) of exhaust valve 107 is set based on opening timing IVO of intake valve 105.

Specifically, at first, based on opening timing IVOREAL of intake valve 105 output from intake side VEL control section B, a retarded angle side limit value EVCLIM0 (refer to FIG. 15) at closing timing EVC of exhaust valve 107 in the case where valve timing of exhaust valve 107 is controlled to the most retarded angle side is calculated.

Then, based on an advance angle amount EVTCNOW of valve timing at that time in exhaust valve 107, and retarded angle side limit value EVCLIM0, a maximum valve lift amount (maximum operating angle) TGEVELLH is set.

Figure 15:
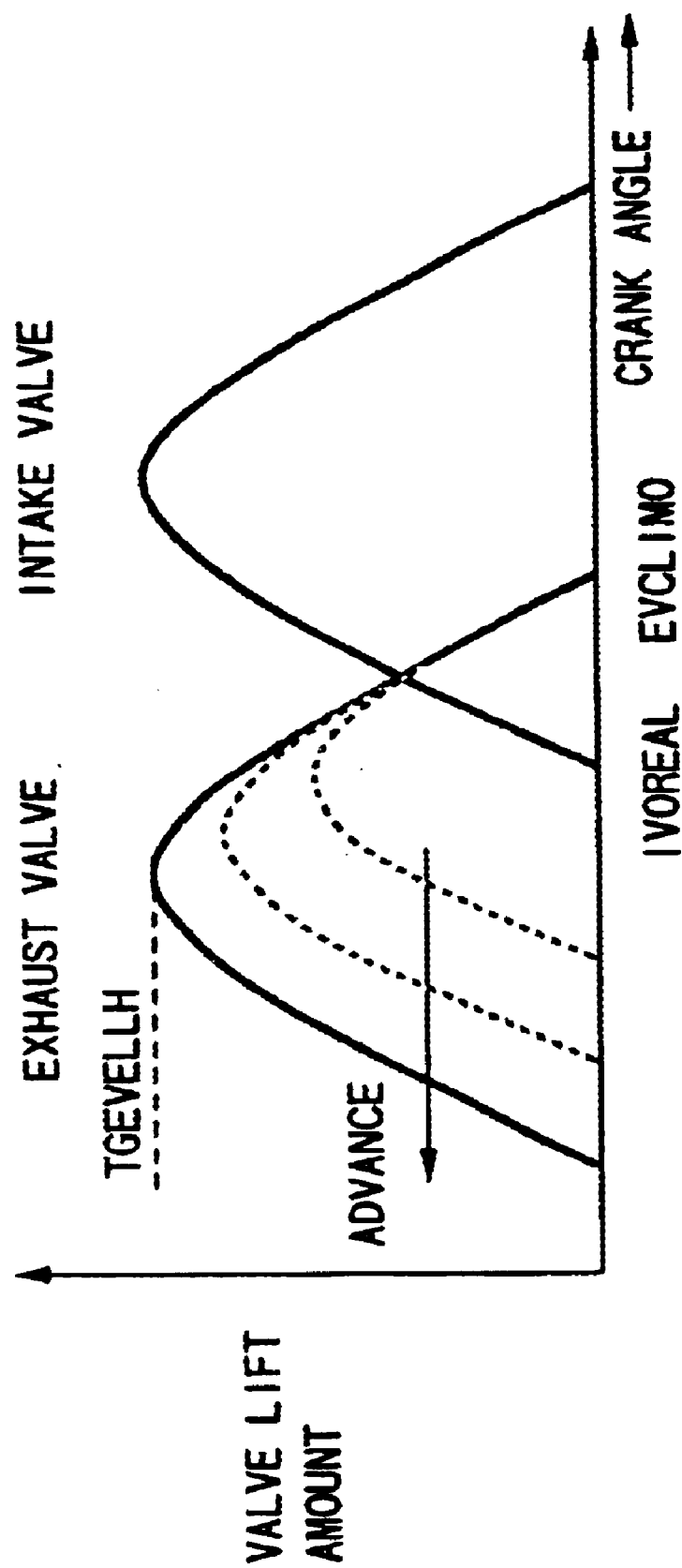
FIG. 15 is a graph showing a correlation between valve timing and a maximum valve lift amount of an exhaust valve.

Here, maximum valve lift amount (maximum operating angle) TGEVELLH is the valve lift (operating angle) wherein closing timing EVC of exhaust valve 107 reaches retarded angle side limit value EVCLIM0 at the valve timing at that time, and becomes larger as the valve timing is further advanced (refer to FIG. 15).

If actual closing timing EVC is limited to maximum valve lift amount (maximum operating angle) TGEVELLH or less, closing timing EVC is not delayed than retarded side limit value EVCLIM0. Thereby, a valve overlap amount is restricted within an allowable value, to avoid valve interference or degradation of combustibility.

Exhaust side VEL limiter control section is input with target operating angle TGEVEL0 of exhaust valve 107 obtained by converting requested opening area TVELAA, minimum valve lift amount (minimum operating angle) TGEVLLL and maximum valve lift amount (maximum operating angle) TGEVELLH.

In the case where target operating angle TGEVEL0 is less than minimum valve lift amount (minimum operating angle) TGEVLLL, exhaust side VEL limiter control section outputs minimum valve lift amount (minimum operating angle) TGEVLLL as target operating angle TGEVEL.

Whereas, in the case where target operating angle TGEVEL0 exceeds maximum valve lift amount (maximum operating angle) TGEVLLH, maximum valve lift amount (maximum operating angle) TGEVLLH is output as target operating angle TGEVEL.

Further, in the case where target operating angle TGEVEL0 is more than minimum valve lift amount (minimum operating angle) TGEVLLL and also less than maximum valve lift amount (maximum operating angle) TGEVLLH, target operating angle TGEVEL0 is output as it is, as target operating angle TGEVEL.

Then, based on target operating angle TGEVEL, DC servo motor 121 in exhaust side variable valve event and lift mechanism 112b is feedback controlled.

Here, in the case of TGEVLLL>TGEVELLH, if target operating angle TGEVEL is limited by minimum valve lift amount (minimum operating angle) TGEVLLL, the valve overlap amount becomes excessive, resulting in valve interference or degradation of combustibility.

Moreover, if target operating angle TGEVEL is limited by maximum valve lift amount (maximum operating angle) TGEVELLH, an opening area of exhaust valve corresponding to target volume flow ratio TQH0ST cannot be obtained, and there occurs a possibility of failure in variable valve event and lift mechanism 112b.

Consequently, in the case where TGEVLLL>TGEVELLH, valve timing of exhaust valve 107 by exhaust side variable valve timing mechanism 113b is forcibly corrected to be advanced, so as to obtain TGEVLLL=TGEVELLH (or TGEVLLL<TGEVELLH).

When valve timing of exhaust valve 107 is corrected to be advanced, since a center position of opening period of exhaust valve 107 is advanced, an angle of from the center position of opening period to retarded angle side limit value EVCLIM0 becomes larger, so that maximum valve lift amount (maximum operating angle) with retarded angle side limit value EVCLIM0 as closing timing EVC is set to be larger (refer to FIG. 15).

While only selected embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

What is claimed is:

1. A variable valve control apparatus for an internal combustion engine, for varying open-close characteristics of an intake valve and an exhaust valve, said apparatus comprising:

an intake side variable valve mechanism that varies the open-close characteristic of said intake valve;

an exhaust side variable valve mechanism that varies the open-close characteristic of said exhaust valve;

an operating condition detector that detects operating conditions of said internal combustion engine;

a control unit that receives a detection signal from said operating condition detector, and outputs control signals to said intake side variable valve mechanism and to said exhaust side variable valve mechanism, based on said detection signal, wherein said control unit determines the open-close characteristic of said intake valve based on the operating conditions of said internal combustion engine to control said intake side variable valve mechanism, and also determines the open-close characteristic of said exhaust valve according to the open-close characteristic of said intake valve to control said exhaust side variable valve mechanism.

2. A variable valve control apparatus for an internal combustion engine according to claim 1, wherein said control unit sets a most retarded angle position of closing timing of said exhaust valve, based on opening timing of said intake valve, and controls the closing timing of said exhaust valve to a more advanced angle side than said most retarded angle position.

3. A variable valve control apparatus for an internal combustion engine according to claim 2, wherein said exhaust side variable valve mechanism comprises a variable valve event and lift mechanism that varies a valve lift amount as well as a valve operating angle of said exhaust valve, and said control unit calculates a maximum valve lift amount by which the closing timing of said exhaust valve becomes said most retarded angle position, and limits the valve lift amount of said exhaust valve by said variable valve event and lift mechanism to be equal to or less than said maximum valve lift amount.

4. A variable valve control apparatus for an internal combustion engine according to claim 2, wherein said exhaust side variable valve mechanism comprises a variable valve event and lift mechanism that varies a valve lift amount as well as a valve operating angle of said exhaust valve, and said control unit limits the valve lift amount of said exhaust valve by said variable valve event and lift mechanism to be equal to or less than said maximum valve lift amount and also to be equal to or above a predetermined minimum valve lift amount.

5. A variable valve control apparatus for an internal combustion engine according to claim 4,
wherein said exhaust side variable valve mechanism comprises, in addition to said variable valve event and lift mechanism, a variable valve timing mechanism that varies the valve timing of said exhaust valve, at the valve operating angle by said variable valve event and lift mechanism, and
said control unit advances the valve timing of said exhaust valve by said variable valve timing mechanism to control said maximum valve lift amount to be equal to or above said predetermined minimum valve lift amount, when said maximum valve lift amount is smaller than said predetermined minimum valve lift amount.

6. A variable valve control apparatus for an internal combustion engine according to claim 4,
wherein said control unit sets said predetermined minimum valve lift amount according to an engine rotation speed.

7. A variable valve control apparatus for an internal combustion engine according to claim 4,
wherein said control unit calculates a target intake air amount based on the operating conditions of the internal combustion engine, to control said intake side variable valve mechanism based on said target intake air amount, and
also sets said predetermined minimum valve lift amount according to said target intake air amount.

8. A variable valve control apparatus for an internal combustion engine according to claim 1,
wherein said control unit calculates a target intake air amount based on the operating conditions of the internal combustion engine, to control said intake side variable valve mechanism based on said target intake air amount.

9. A variable valve control apparatus for an internal combustion engine according to claim 1,
wherein said intake side variable valve mechanism and said exhaust side variable valve mechanism each comprises a variable valve event and lift mechanism that varies a valve lift amount as well as a valve operating angle,
said variable valve event and lift mechanism comprises:
a drive shaft rotating in synchronism with a crankshaft;
a drive cam fixed to said drive shaft;
a swing cam swinging to operate said valves to open and close;
a transmission mechanism with one end connected to said drive cam side and the other end connected to said swing cam side;
a control shaft having a control cam changing the position of said transmission mechanism; and
an actuator rotating said control shaft, and
continuously changes the valve lift amount as well as the valve operating angle by rotatably controlling said control shaft by said actuator.

10. A variable valve control apparatus for an internal combustion engine, for varying open-close characteristics of an intake valve and an exhaust valve, said apparatus comprising:
intake side variable valve means for varying the open-close characteristic of said intake valve;
exhaust side variable valve means for varying the open-close characteristic of said exhaust valve;
operating condition detecting means for detecting operating conditions of said internal combustion engine;
intake valve control means for determining the open-close characteristic of said intake valve based on the operating conditions of said internal combustion engine to control said intake side variable valve means; and
exhaust valve control means for determining the open-close characteristic of said exhaust valve according to the open-close characteristic of said intake valve to control said exhaust side variable valve means.

11. A variable valve control method for an internal combustion engine, for controlling an intake side variable valve mechanism that varies an open-close characteristic of an intake valve and an exhaust side variable valve mechanism that varies an open-close characteristic of an exhaust valve, comprising the steps of:
detecting operating conditions of said internal combustion engine;
determining the open-close characteristic said intake valve based on the operating conditions of said internal combustion engine;
controlling said intake side variable valve mechanism according to the open-close characteristic;
determining the open-close characteristic of said exhaust valve according to the open-close characteristic of said intake valve; and
controlling said exhaust side variable valve mechanism according to the open-close characteristic of said exhaust valve.

12. A variable valve control method for an internal combustion engine according to claim 11,
wherein said step of determining the open-close characteristic of said exhaust valve comprises the steps of:
setting a most retarded angle position of closing timing of said exhaust valve, based on opening timing of said intake valve; and
controlling the closing timing of said exhaust valve to a more advanced angle side than said most retarded angle position.

13. A variable valve control method for an internal combustion engine according to claim 12,
wherein said exhaust side variable valve mechanism comprises a variable valve event and lift mechanism that varies a valve lift amount as well as a valve operating angle of said exhaust valve, and
said step of controlling the closing timing of said exhaust valve comprises the steps of:
calculating a maximum valve lift amount by which the closing timing of said exhaust valve becomes said most retarded angle position; and
limiting the valve-lift amount of said exhaust valve by said variable valve event and lift mechanism to be equal to or less than said maximum valve lift amount.

14. A variable valve control method for an internal combustion engine according to claim 12,
wherein said exhaust side variable valve mechanism comprises a variable valve event and lift mechanism that varies a valve lift amount as well as a valve operating angle of said exhaust valve, and
said step of controlling the closing timing of said exhaust valve comprises the steps of:
calculating a maximum valve lift amount by which the closing timing of said exhaust valve becomes said most retarded angle position; and limiting the valve lift amount of said exhaust valve by said variable valve event and lift mechanism to be equal to or less than said maximum valve lift amount and also to be equal to or above a predetermined minimum valve lift amount.

15. A variable valve control method for an internal combustion engine according to claim 14, wherein said exhaust side variable valve mechanism comprises, in addition to said variable valve event and lift mechanism, a variable valve timing mechanism that varies the valve timing of said exhaust valve, at the valve operating angle by said variable valve event and lift mechanism, and said step of calculating the maximum value lift amount comprises the steps of:

controlling said variable valve timing mechanism to advance the valve timing of said exhaust valve, when said maximum valve lift amount is smaller than said predetermined minimum valve lift amount; and calculating the maximum valve lift amount by which the closing timing of said exhaust valve becomes said most retarded angle position, under a condition where the valve timing of said exhaust valve is advanced.

16. A variable valve control method for an internal combustion engine according to claim 14, wherein said step of limiting the valve lift amount of said exhaust valve comprises the step of;

setting said predetermined minimum valve lift amount according to an engine rotation speed.

17. A variable valve control method for an internal combustion engine according to claim 14, wherein said step of determining the open-close characteristic of said intake valve comprises the steps of:

calculating a target intake air amount based on the operating conditions of the internal combustion engine; and determining the open-close characteristic of said intake valve based on said target intake air amount, and said step of limiting the valve lift amount of said exhaust valve comprises the step of;

setting said predetermined minimum valve lift amount according to said target intake air amount.

18. A variable valve control method for an internal combustion engine according to claim 11, wherein said step of determining the open-close characteristic of said intake valve comprises the steps of:

calculating a target intake air amount based on the operating conditions of the internal combustion engine; and determining the open-close characteristic of said intake valve based on said target intake air amount.

19. A variable valve control method for an internal combustion engine according to claim 11, wherein said intake side variable valve mechanism and said exhaust side variable valve mechanism each comprises a variable valve event and lift mechanism that varies a valve lift amount as well as a valve operating angle, said variable valve event and lift mechanism comprises:

a drive shaft rotating in synchronism with a crankshaft;

a drive cam fixed to said drive shaft;

a swing cam swinging to operate said valves to open and close;

a transmission mechanism with one end connected to said drive cam side and the other end connected to said swing cam side;

a control shaft having a control cam changing the position of said transmission mechanism; and an actuator rotating said control shaft, and continuously changes the valve lift amount as well as the valve operating angle by rotatably controlling said control shaft by said actuator.

* * * * *